(12) United States Patent
Miyagawa et al.

(10) Patent No.: US 9,803,733 B2
(45) Date of Patent: Oct. 31, 2017

(54) ROTATION DEVICE AND POWER SUPPLY SYSTEM

(71) Applicant: Simple Tokyo Co., Ltd., Tokyo (JP)

(72) Inventors: Megumi Miyagawa, Tokyo (JP); Keiko Kondo, Tokyo (JP)

(73) Assignee: Simple Tokyo Co., Ltd., Tokyo (JP)

( * ) Notice: Subject to any disclaimer, the term of this patent is extended or adjusted under 35 U.S.C. 154(b) by 175 days.

(21) Appl. No.: 14/840,455

(22) Filed: Aug. 31, 2015

(65) Prior Publication Data
US 2016/0265638 A1 Sep. 15, 2016

(30) Foreign Application Priority Data

Mar. 11, 2015 (JP) ................. 2015-048496

(51) Int. Cl.
| | |
|---|---|
| *F02B 63/04* | (2006.01) |
| *F03G 7/08* | (2006.01) |
| *F16H 33/18* | (2006.01) |
| *F16H 57/10* | (2006.01) |
| *F03G 3/00* | (2006.01) |
| *F03G 7/10* | (2006.01) |

(52) U.S. Cl.
CPC ............ *F16H 33/185* (2013.01); *F03G 3/00* (2013.01); *F16H 57/10* (2013.01); *F03G 7/10* (2013.01); *Y10S 74/09* (2013.01)

(58) Field of Classification Search
CPC ..... F03G 3/00; F03G 3/02; F03G 3/06; F16H 33/02; F16H 33/185
USPC .................................................. 290/1 A, 1 R
See application file for complete search history.

(56) References Cited

U.S. PATENT DOCUMENTS

| | | | | |
|---|---|---|---|---|
| 3,509,716 A | * | 5/1970 | Avery ...................... | C02F 1/14 60/531 |
| 3,728,911 A | * | 4/1973 | Granville .............. | F16H 33/185 475/255 |
| 4,589,259 A | * | 5/1986 | Boutto ...................... | F03G 3/00 185/7 |
| 5,267,912 A | * | 12/1993 | Casanova ............. | F16H 33/185 192/20 |
| 8,604,628 B2 | * | 12/2013 | Kondo ...................... | F03G 3/00 290/1 R |

FOREIGN PATENT DOCUMENTS

JP 2014122561 A * 7/2014

* cited by examiner

*Primary Examiner* — Tulsidas C Patel
*Assistant Examiner* — Thomas Quigley
(74) *Attorney, Agent, or Firm* — Haug Partners LLP; William S. Frommer (57) ABSTRACT

A rotation device includes an output shaft, at least one rotatable rotary plate member arranged so that its rotation axis and the output shaft are coaxial, at least one weight member fixed to the rotary plate member, for biasing position of the center of gravity from the rotation axis of the rotary plate member, and at least one clutch mechanism arranged between the rotary plate member and the output shaft, for separating the rotary plate member and the output shaft with each other at a predetermined rotation angle. The clutch mechanism connects the rotary plate member with the output shaft when the center of gravity of the weight member descends, and separates the rotary plate member from the output shaft when the center of gravity of the weight member rises.

10 Claims, 10 Drawing Sheets

ROTATION DEVICE AND POWER SUPPLY SYSTEM

BACKGROUND OF THE INVENTION

Field of the Invention

The present invention relates to a rotation device capable of maintaining rotation of an output shaft as long as possible by effectively using a rotational moment based upon the gravity, and to a power supply system with the rotation device.

Description of the Related Art

In order to use in power supply systems or other various systems, there are rotation devices maintaining their rotary energy at the smallest loss. As for an example of the prior art rotation devices, known is a device described in Japanese Patent Publication No. H08-061214A (hereinafter referred as JP08-061214), which intends to maintain its turn as long as possible.

The rotation device described in JP08-061214 has a rotation shaft, spoke-like rotators fixed to the rotation shaft, slide weights formed long along the axial directions of the respective rotators and freely movable along the axial directions of the respective rotators, and a circular guide for decentering the rotation orbit of the slide weights that turn around the rotation shaft, from the center of the rotation shaft.

According to this rotation device described in JP08-061214, since the rotation orbit of the slide weights is regulated by the circular guide to decenter from the center of the rotation shaft, the rotation shaft turns based upon the principle of leverage in which a downward rotation moment of the slide weights becomes larger than an upward rotation moment of the slide weights.

Inventors of the present application had examined using a device with the similar configuration as that of the rotation device described in JP08-061214 to develop various power supply systems. However, it was revealed that such kind of rotation device could not maintain its rotation for a long period time.

As a result of the consideration why such rotation device described in JP08-061214 could not continue its rotation for a long period of time, it was revealed that an angular speed of the rotation of the slide weights caused by the difference of the rotation moments dropped to lower level due to the friction between the members such as the slide weights and the guide, and that the drop of the angular speed due to this friction was more large and rapid than that of the angular speed caused by the difference of the rotation moments.

Thus, the inventors have been studied to develop an excellent rotation device that has a considerably reduced friction between the members and also that can maintain its rotation as long as possible.

SUMMARY OF THE INVENTION

It is therefore an object of the present invention to provide a rotation device and a power supply system, which can maintain its rotation for a longer period of time by effectively using a rotational moment based upon the gravity so that the rotation device can be used in various applications.

According to the present invention, a rotation device includes an output shaft supported in rotatable state so that an axis line of the output shaft is in parallel to a horizontal direction that is perpendicular to the gravity direction, at least one rotatable rotary plate member arranged so that rotation axis of the at least one rotary plate member and the axis line of the output shaft are coaxial, at least one weight member fixed respectively to the at least one rotary plate member, for biasing position of the center of gravity from the rotation axis of the at least one rotary plate member, and at least one clutch mechanism arranged between the at least one rotary plate member and the output shaft, and capable of separating the at least one rotary plate member and the output shaft with each other at a predetermined rotation angle. The at least one clutch mechanism is adapted, during rotation of the at least one rotary plate member, to connect the at least one rotary plate member with the output shaft when the center of gravity of the at least one weight member descends, and to separate the at least one rotary plate member from the output shaft when the center of gravity of the at least one weight member rises.

Thus, according to the present invention, the at least one clutch mechanism arranged between the at least one rotary plate member and the output shaft connects the at least one rotary plate member with the output shaft when the center of gravity of the at least one weight member descends and separates the at least one rotary plate member from the output shaft when the center of gravity of the at least one weight member rises. Therefore, when the center of gravity of the at least one weight member descends, a rotational moment is applied to the output shaft, and, on the other hand, when the center of gravity of the at least one weight member rises no reverse rotational moment is applied to the output shaft. That is, in the latter case, the center of gravity of the at least one weight member rises due to inertia force. At the time the center of gravity of the at least one weight member rises, since the at least one rotary plate member and the output shaft are separated with each other, friction loss is extremely low. As a result, rotation energy of the rotation device can be maintained for a long stretch of time.

It is preferred that the at least one clutch mechanism includes a gear transmission mechanism fixed to the at least one rotary plate member and provided with a plurality of planetary gear, a cam plate fixed to a bearing for supporting the output shaft and provided with an eccentric circular groove on its one side surface and a via hole at the center of the cam plate for passing the output shaft there through, and a cam follower coupled to one of the plurality of planetary gears to move along the eccentric circular groove, and that, in one planetary gear coupled to the cam follower, a gear-rotation restraint means capable of limiting rotation of the one planetary gear depending upon displacement of the cam follower is arranged so that the at least one rotary plate member and the output shaft are connected with each other when the rotation of the one planetary gear is limited by the gear-rotation restraint means. Thereby, connection and separation of the at least one rotary plate member with the output shaft can be implemented by a mechanical configuration without using an electrical control system.

It is also preferred that the at least one clutch mechanism is adapted, during rotation of the at least one rotary plate member, to connect the at least one rotary plate member with the output shaft when the at least one weight member rotates to a first angle position where the center of gravity of the at least one weight member passes by a predetermined angle from the position directly above the center of rotation, and to separate the at least one rotary plate member from the output shaft when the at least one weight member rotates to a second angle position where the center of gravity of the at least one weight member passes by 180 degrees from the first angle position. Thereby, the rotational moment due to the gravity of the weight member and the inertia force can be effectively utilized.

It is further preferred that the rotation device further includes at least one auxiliary driving mechanism for assisting the rotation of the at least one rotary plate member and the at least one weight member when the center of gravity of at least one weight member at least rises. Thereby, the center of gravity of the weight member can be raised smoothly, and more stable rotation of the rotation device can be maintained.

It is further preferred that the at least one rotatable rotary plate member is a plurality of rotatable rotary plate members arranged so that rotation axes of the rotary plate members and the axis line of the output shaft are coaxial, the at least one weight member is a plurality of weight members fixed respectively to the rotary plate members, for biasing positions of the center of gravity from the rotation axis of the rotary plate members, and the at least one clutch mechanism is a plurality of clutch mechanisms arranged respectively between the rotary plate members and the output shaft and capable of separating the rotary plate members and the output shaft with each other at a predetermined rotation angle, and that the weight members are arranged so that positions of the center of gravity of the weight members have an equal angle interval with each other. Thereby, a more stable rotation of the rotation device can be maintained.

According to the present invention, also, a power supply system includes the aforementioned rotation device, a generator coupled to the output shaft of the rotation device, a solar light power generation device, and an electrical storage device for storing electrical power generated by the generator and the solar light power generation device. This power supply system is capable of providing an electrical power to the rotation device from the electrical storage device or a commercial power supply system, and also capable of providing an electrical power from the electrical storage device to outside.

Thus, according to the present invention, it is possible to maintain electrical power energy of nighttime power as a rotational energy of the rotation device, and also to maintain the electrical power energy of the nighttime power as electrical power energy by charging in the electrical storage device. Furthermore, by combining with the solar light power generation device, it is possible to effectively utilize the electrical power from the solar light power generation device.

Further objects and advantages of the present invention will be apparent from the following description of the preferred embodiments of the invention as illustrated in the accompanying drawings.

DESCRIPTION OF THE PREFERRED EMBODIMENTS

Hereinafter, a preferred embodiment of a rotation device according to the present invention will be described. FIGS. 1, 2 3a and 3b, 4, 5a and 5b, 6a to 6d, 7a to 7d, 8a to 8d and 9a to 9d schematically illustrate a configuration of the embodiment of the rotation device according to the present invention.

Figure 1:
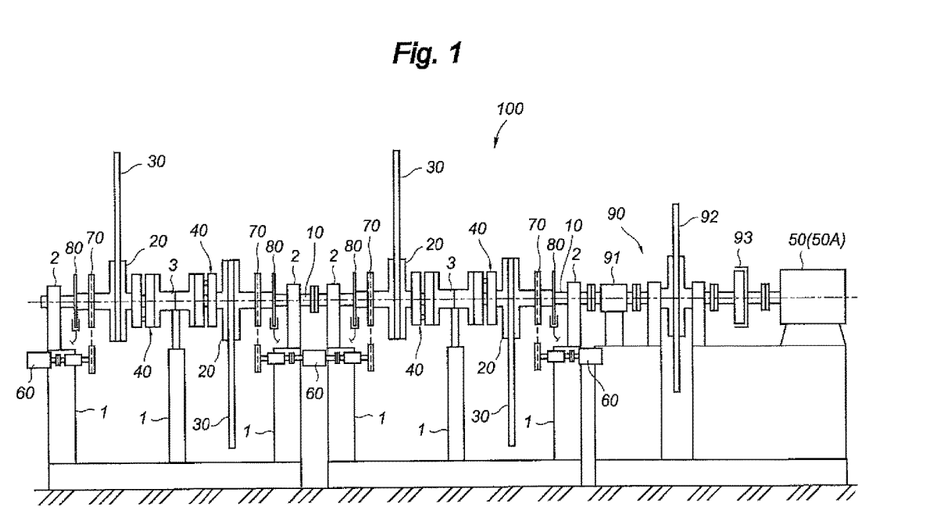
FIG. 1 is a side view schematically illustrating a rotation device in a preferred embodiment according to the present invention.
Figure 2:
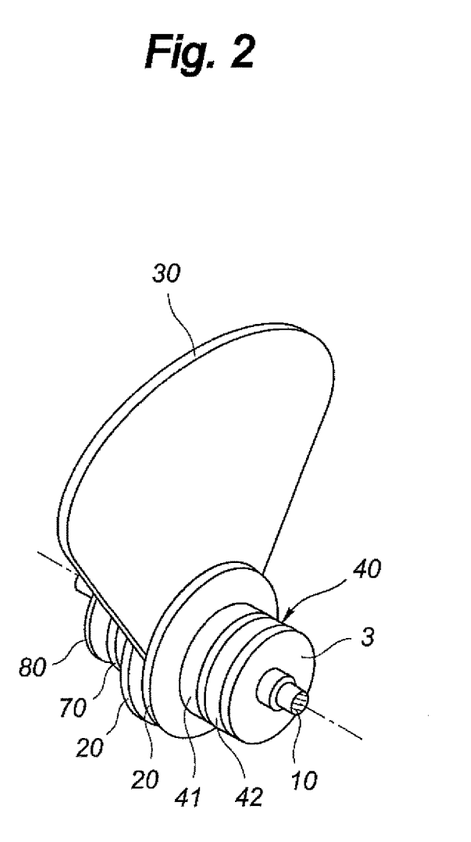
FIG. 2 is a perspective view schematically illustrating a configuration of the main part of the rotation device shown in FIG. 1.
Figure 3A:
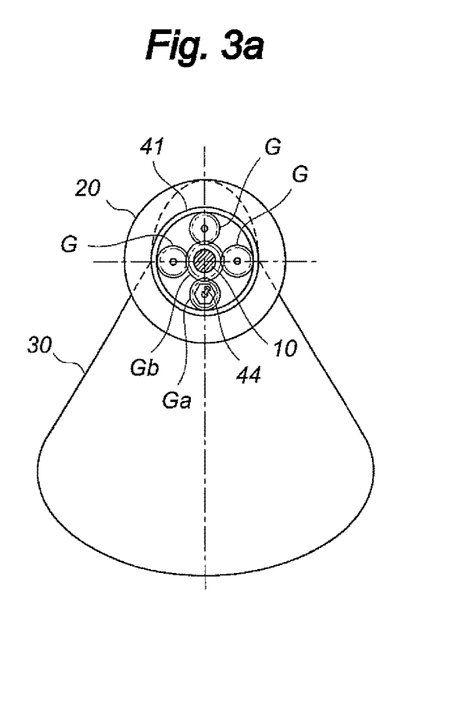
FIGS. 3a and 3b are views schematically illustrating an internal configuration of a clutch mechanism of the rotation device shown in FIG. 1.
Figure 3B:
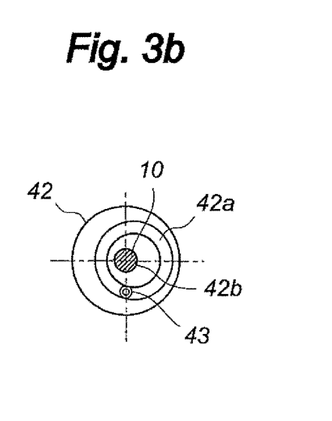
Figure 4:
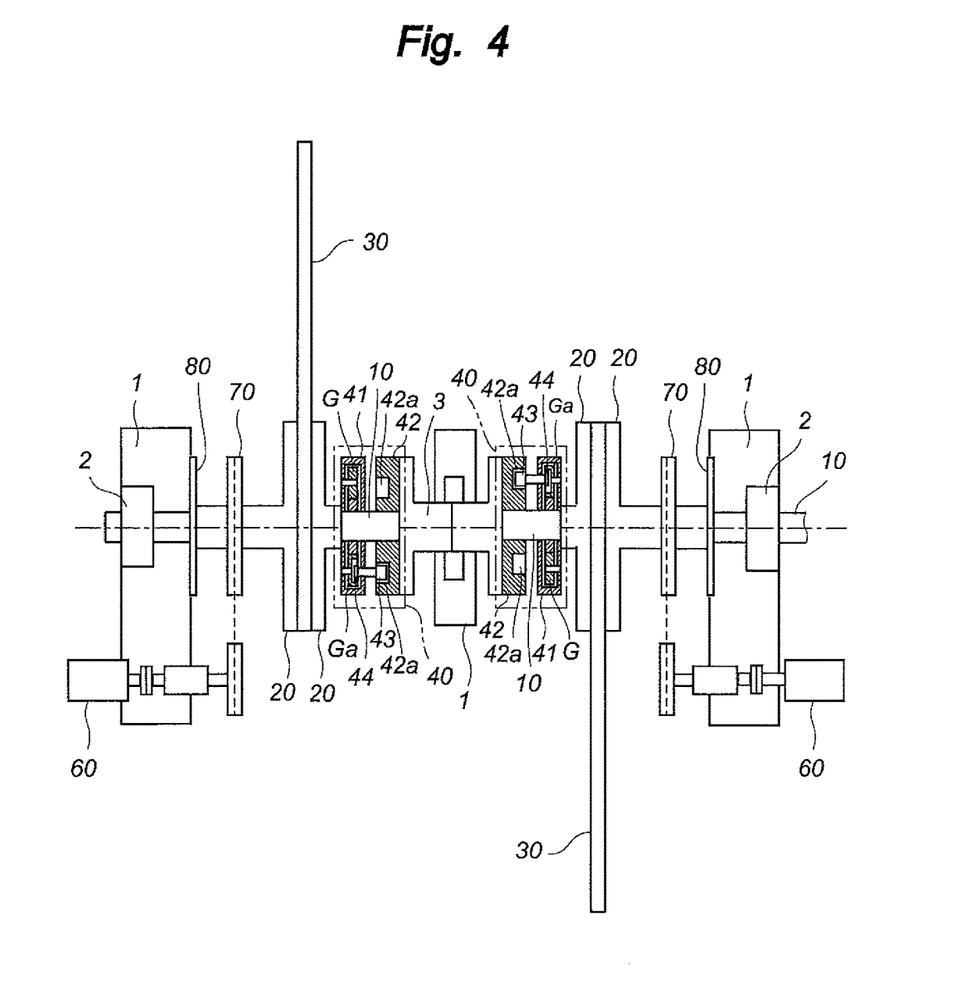
FIG. 4 is a partial sectional view schematically illustrating a configuration of a gear transmission mechanism and a guide member in the clutch mechanism of the rotation device shown in FIG. 1.
Figure 5A:
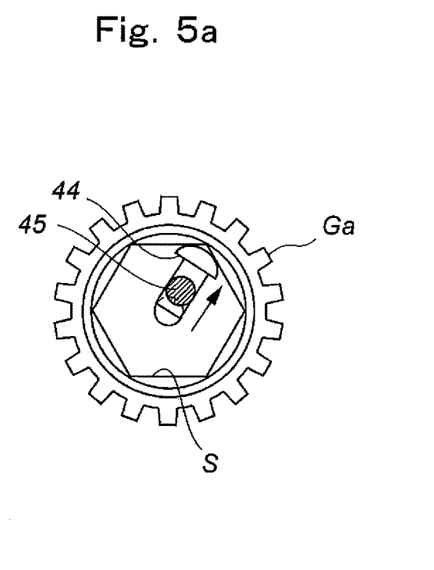
FIGS. 5a and 5b are views schematically illustrating a state where gear rotation of the clutch mechanism is stopped and a state where the stoppage is released, respectively.
Figure 5B:
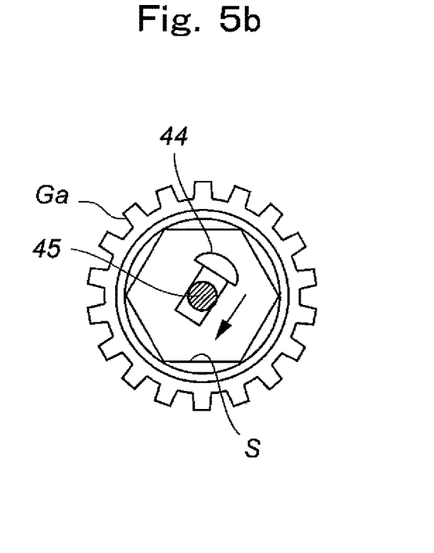

FIG. 1 shows the configuration of the rotation device 100 having four sets of rotary plate members 20, weight members 30 and clutch mechanisms 40, and FIG. 2 shows an appearance of one set of the rotary plate members 20, the weight members 30 and the clutch mechanisms 40. FIG. 3a shows an internal configuration of a gear transmission mechanism 41 of the clutch mechanism 40, and FIG. 3b shows an internal configuration of a cam plate 42 of the clutch mechanism 40. FIG. 4 shows a coupled state of the rotary plate member 20, the weight member 30 and the clutch mechanism 40. Also, FIG. 5a shows a state where gear rotation of the clutch mechanism is stopped and FIG. 5b shows a state where the stoppage is released. Further, FIGS. 6a-6d, 7a-7d, 8a-8d and 9a-9d show first to fourth operations of the weight member 30 and the clutch mechanism 40, respectively.

As shown in FIGS. 1 to 4, the rotation device 100 in this embodiment has an output shaft 10 arranged in rotatable state so that its axis line is in parallel to the substantially horizontal direction that is perpendicular to the gravity direction, the rotatable rotary plate members 20 axially coupled to the output shaft 10 so that their rotation axis and the axis line of the output shaft 10 become coaxial, the weight members 30 fixed respectively to the rotary plate members 20, for biasing the position of the center of gravity from the rotation axis of the rotary plate members 20, the clutch mechanisms 40 respectively arranged between the rotary plate members 20 and the output shaft 10, and being capable of separating the rotary plate members 20 and the output shaft 10 with each other at a predetermined rotation angle, drive motors 50, auxiliary motors 60, auxiliary drive pulleys 70, rotation measurement means 80, and a rotation conversion mechanism 90. In this embodiment, the rotation device 100 has four sets of the rotary plate members 20, the weight members 30 and the clutch mechanisms 40, and each of the weight members 30 is arranged with each other to have an angle interval of 90 degrees.

The output shaft 10 is a rotation shaft made of steel for example, and supported by bearings 2 and 3 mounted on respective support members 1 made of a metal frame so as to smoothly rotate.

The rotary plate members 20 are coaxially coupled with the output shaft 10. In this embodiment, one pair of the rotary plate members 20 are provided for each weight member 30 so as to sandwich the weight member 30 between these rotary plate members 20. In modifications, only one rotary plate member 20 may be provided for each weight member 30.

Each of the weight members 30 is formed in a fan-like shape for example and arranged to bias the center of gravity position from the rotation axis of the rotary plate member 20. The four weight members 30 are mechanically fixed to the respective four pairs of rotary plate members 20 at positions to have an angle interval of a predetermined angle (90 degrees) with each other.

Each of the clutch mechanisms 40 has the gear transmission mechanism 41 fixed to the rotary plate member 20 and provided with a plurality of planetary gear G, the cam plate 42 fixed to the bearing 3 that supports the output shaft 10 and provided with an eccentric circular groove 42a on its one side surface and a via hole 42b at the center of the cam plate 42 for passing the output shaft 10 there through, and a cam follower 43 coupled to one of the plurality of planetary gears G to move along the eccentric circular groove 42a. In a planetary gear Ga coupled to this cam follower 43, a concave portion S with a side peripheral wall in a hexagonal shape is formed. Within the concave portion S in the planetary gear Ga, an abutment member 44 or a gear-rotation restraint means capable of abutting to the side peripheral wall of the concave portion S depending upon displacement of the cam follower 43 so as to limit the rotation of this planetary gear Ga is arranged. The cam follower 43 and the abutment member 44 are coupled each other through a joint 45. The clutch mechanism 40 is configured to operate as follows. When the rotation of the planetary gear Ga is limited by the abutment member 44, the planetary gear Ga does not rotate with respect to an output shaft gear Gb fixed to the output shaft 10 and thus the rotary plate member 20 and the output shaft 10 together rotate. The abutment member 44 moves, as shown in FIGS. 5a and 5b, to make one limitation state for limiting the rotation of the planetary gear Ga and one cancellation state for releasing the limitation of the rotation based upon the movement of the cam follower 43, during one round of the output shaft 10. As a result, the clutch mechanism 40 is engaged to connect the rotary plate member 20 with the output shaft 10 when the center of gravity W of the weight member 30 descends, and the rotary plate member 20 is separated from the output shaft 10 when the center of gravity W of the weight member 30 rises.

The drive motor 50 is used at the time of initial driving of the rotation device 100. When the rotation of the rotation device 100 reaches a predetermined speed, the drive motor 50 is separated from the output shaft 10 by means of a clutch 93. Also, the drive motor 50 can function as a generator 50A. When the rotational energy is provided from the rotation device 100 after its initial driving, the drive motor 50 functions as a generator 50A to generate electrical power. That is, the drive motor 50 or the generator 50A converts the rotational energy of the rotation device 100 into an electrical energy.

The auxiliary motors GO and the auxiliary drive pulleys 70, that are auxiliary driving mechanisms, assist the rotation of the rotary plate members 20 and the weight members 30 when the center of gravity W of each weight member 30 rises. Because there exists rotational inertia of the weight member 30, it is possible to easily rise the center of gravity W of the weight member 30 by additionally applying a little amount of the rotational energy.

The rotation measurement means 80 are adapted to detect a rotational speed or an RPM. The rotational speed or the RPM detected by the rotation measurement means 80 is provided to a control unit (not shown) to control connection and separation of the drive motor 50 or the generator 50A with the output shaft 10.

The rotation conversion mechanism 90 has a transmission 91, a flywheel 92 and the clutch 93. The transmission 91 is coupled with one end portion (an output side portion) of the output shaft 10, to convert the rotational speed transmitted between the drive motor 50 and the weight member 30. During the initial driving stage of the rotation device 100, the rotational speed of the drive motor 50 is reduced and then transmitted to the output shaft 10. Whereas during the rotational energy output stage of the rotation device 100, the rotational speed of the output shaft 10 is increased to a level that is necessary for operation of the generator 50A and then transmitted to the generator 50A. The flywheel 92 is formed from a circular metal plate member and attached to the output shaft 10. This flywheel 92 is adapted to increase the rotational inertia moment so as to keep the rotational speed of the rotation device 100 with a gentle change. The clutch 93 is mounted between the transmission 91 and the drive motor 50 or the generator 50A to transmit the rotation or to cut off the transmission. An electromagnetic clutch may be used for the clutch 93 for example.

Hereinafter, operation of the rotation device 100 in this embodiment will be described using one of four sets of the rotary plate members 20, the weight members 30 and the clutch mechanisms 40 with reference to FIGS. 6a-6d, FIGS. 7a-7d, FIGS. 8a-8d and FIGS. 9a-9d.

FIGS. 6a-6d show states where the center of gravity W of the weight member 30a is located at a position rotated by 15 degrees and 90 degrees from the position directly above the center of rotation, FIGS. 7a-7d show states where the center of gravity W of the weight member 30a is located at a position rotated by 165 degrees and 180 degrees from the position directly above the center of rotation, FIGS. 8a-8d show states where the center of gravity W of the weight member 30a is located at a position rotated by 195 degrees and 270 degrees from the position directly above the center of rotation, and FIGS. 9a-9d show states where the center of gravity W of the weight member 30a is located at a position rotated by 345 degrees and 15 degrees from the position directly above the center of rotation.

When the rotation device 100 is initially driven by the drive motor 50, the output shaft 10, the rotary plate members 20 and the weight members 30, for example, rotate in the clockwise direction.

Figures 6A, 6B:
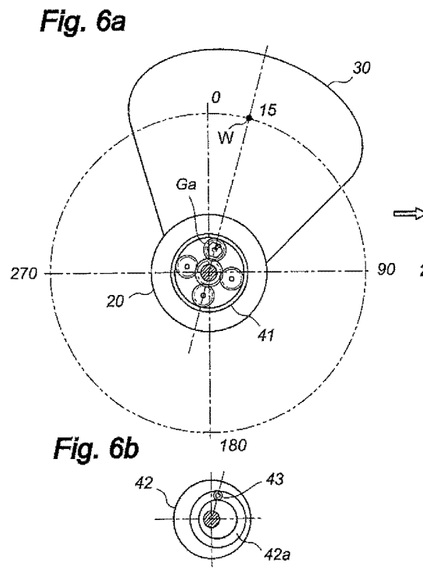
FIGS. 6a to 6d are plane views schematically illustrating first operations of a weight member and the clutch mechanism of the rotation device shown in FIG. 1.
Figures 6C, 6D:
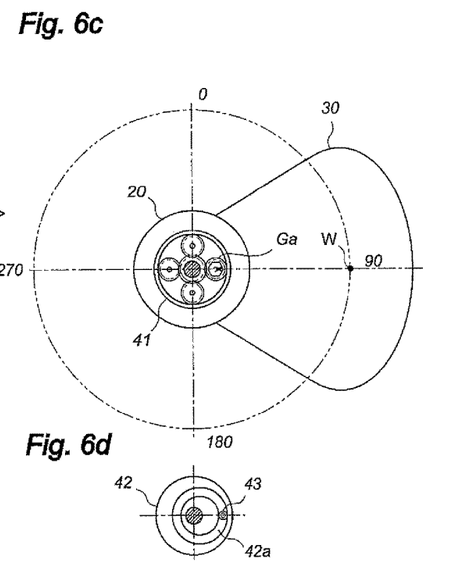

As shown in FIGS. 6a and 6b, when the weight member 30 rotates to a position where the center of gravity W of the weight member 30 passes by 15 degrees from the position directly above the center of rotation, the rotation of the planetary gear Ga coupled with the cam follower 43 is limited by the abutment member 44 so that this planetary gear Ga does not rotate with respect to the output shaft gear Gb fixed to the output shaft 10. Thereby, both the rotary plate member 20 fixed to the weight member 30 and the output shaft 10 rotate together, and thus the rotation of the output shaft 10 due to the gravity of the weight member 30 is attained. Also, as shown in FIGS. 6c and 6d, when the weight member 30 rotates to a position where the center of gravity W of the weight member 30 passes by 90 degrees from the position directly above the center of rotation, the rotation of the planetary gear Ga with respect to the output shaft gear Gb is limited and thus the weight member 30 and the output shaft 10 rotate together. In this position, the cam follower 43 locates at the maximum decentering position of the eccentric circular groove 42a.

Figure 7A:
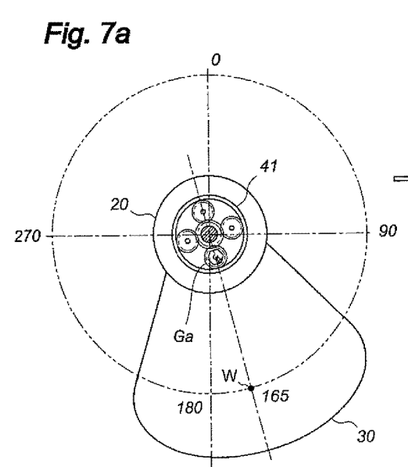
FIGS. 7a to 7d are plane views schematically illustrating second operations of the weight member and the clutch mechanism of the rotation device shown in FIG. 1.
Figure 7B:
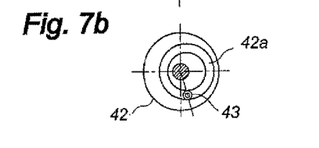
Figure 7C:
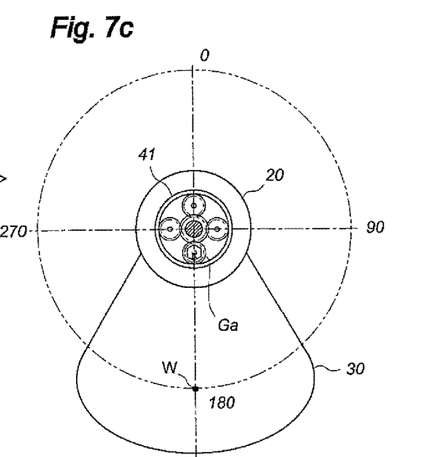
Figure 7D:
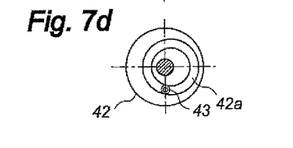

As shown in FIGS. 7a and 7b, when the weight member 30 rotates to a position where the center of gravity W of the weight member 30 passes by 165 degrees from the position directly above the center of rotation, cancellation of the rotation limitation of the planetary gear Ga is started. Also, as shown in FIGS. 7c and 7d, when the weight member 30 rotates to a position where the center of gravity W of the weight member 30 passes by 180 degrees from the position directly above the center of rotation, the rotational moment due to the gravity disappears and thus the weight member 30 continues its rotation by the inertia force.

Figure 8A:
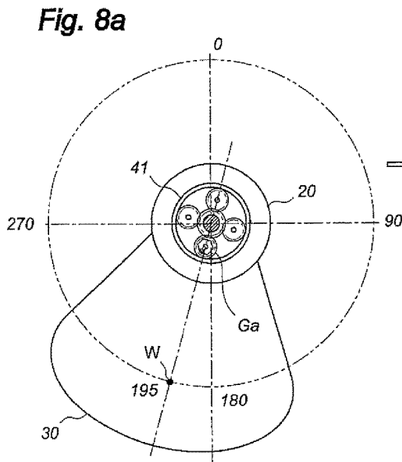
FIGS. 8a to 8d are plane views schematically illustrating third operations of the weight member and the clutch mechanism of the rotation device shown in FIG. 1.
Figure 8B:
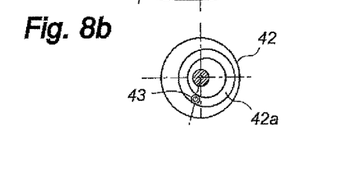
Figure 8C:
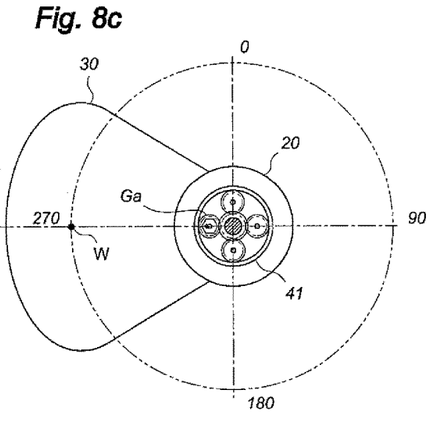
Figure 8D:
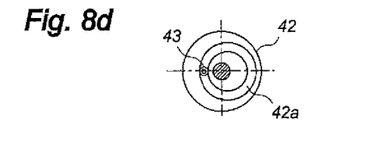

As shown in FIGS. 8a and 8b, when the weight member 30 rotates to a position where the center of gravity W of the weight member 30 passes by 195 degrees from the position directly above the center of rotation, the cancellation of the rotation limitation of the planetary gear Ga is completed and thus the planetary gear Ga can rotate with respect to the output shaft gear Gb. Namely, at this time the output shaft 10 and the weight member 30 are separated with each other. As shown in FIGS. 8c and 8d, the weight member 30 rotates by the inertia force to a position where the center of gravity W of the weight member 30 passes by 270 degrees from the position directly above the center of rotation.

Figure 9A:
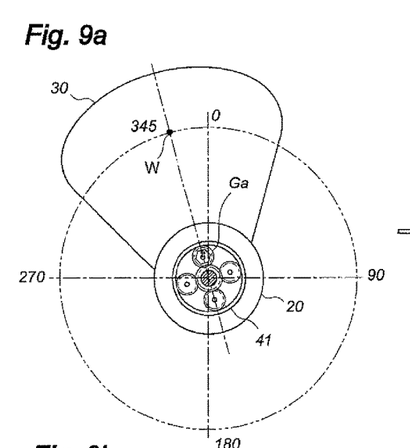
FIGS. 9a to 9d are plane views schematically illustrating fourth operations of the weight member and the clutch mechanism of the rotation device shown in FIG. 1.
Figure 9B:
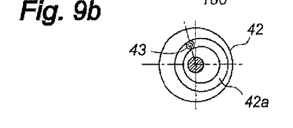
Figure 9C:
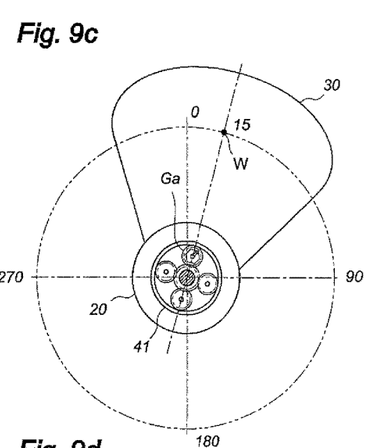
Figure 9D:
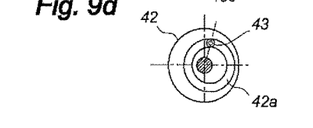

The rotation device 100 rotates by the auxiliary motors 60 from a position where the center of gravity W of the weight member 30 passes by 270 degrees from the position directly above the center of rotation to a position where the center of gravity W of the weight member 30 passes by 360 degrees from the position directly above the center of rotation. As shown in FIGS. 9a and 9b, when the weight member 30 rotates to a position where the center of gravity W of the weight member 30 passes by 345 degrees from the position directly above the center of rotation, the rotation limitation of the planetary gear Ga is started. Then, as shown in FIGS. 9c and 9d, when the weight member 30 rotates to a position where the center of gravity W of the weight member 30 passes by 15 degrees from the position directly above the center of rotation, the rotation of the planetary gear Ga coupled with the cam follower 43 is limited by the abutment member 44 so that this planetary gear Ga does not rotate with respect to the output shaft gear Gb fixed to the output shaft 10. Thereby, both the rotary plate member 20 fixed to the weight member 30 and the output shaft 10 rotate together, and thus the rotation of the output shaft 10 due to the gravity of the weight member 30 is attained again. As a result, the weight member 30 and the output shaft 10 continue rotation for a long stretch of time.

As discussed above, according to the rotation device 100 of this embodiment, since the clutch mechanisms 40 are provided, when the weight member 30 downwardly rotates from the upper side toward the lower side, both the weight member 30 and the output shaft 10 rotate together to turn the output shaft 10 due to the gravity of the weight member 30. On the other hand, when the weight member 30 upwardly rotates from the lower side toward the upper side, the weight member 30 and the output shaft 10 are separated with each other and thus the weight member 30 rotates due to its inertia force and the auxiliary motor. Thereby, the rotation device 100 can maintain its turn for a longer stretch of time and thus can utilize as a electrical power generation apparatus.

The clutch mechanism 40 of this rotation device is configured to have the gear transmission mechanism 41 fixed to the rotary plate member 20 and provided with the plurality of planetary gears G and Ga, the cam plate 42 fixed to the bearing 3 for supporting the output shaft 10 and provided with the eccentric circular groove 42a on its one side surface and the via hole 42b at the center of the cam plate 42 for passing through the output shaft 10, and the cam follower 43 coupled to one of the plurality of planetary gears G to move along the eccentric circular groove 42a. In the planetary gear Ga coupled to the cam follower 43, the abutment member 44 capable of limiting the rotation of this planetary gear Ga depending upon displacement of the cam follower 43 is arranged. When the rotation of the planetary gear Ga is limited by the abutment member 44, the rotary plate member 20 and the output shaft 10 together rotate. Thus, according to this clutch mechanism 40, connection and separation of the rotary plate member 20 with the output shaft 10 can be attained by using the mechanical configuration without using any electrical control system.

Also, the clutch mechanism 40 is configured such that the rotary plate member 20 and the output shaft 10 are connected to each other when the weight member 30 rotates to a position where the center of gravity W of the weight member 30 passes by 15 degrees from the position directly above the center of rotation, and that the rotary plate member 20 and the output shaft 10 are separated with each other when the weight member 30 rotates to a position where the center of gravity W of the weight member 30 passes by 195 degrees from the position directly above the center of rotation. Therefore, it is possible to effectively use the rotation moment due to the gravity of the weight member 30 and the inertia force thereof.

Furthermore, since the rotation device 100 is provided with the auxiliary motors 60 and the auxiliary drive pulleys 70 that assist the rotational energy of the rotary plate members 20 and the weight members 30 when the center of gravity W of each weight member 30 rises, it is possible to smoothly rise the center of gravity W of the weight member 30 to keep more stable rotation.

Figure 10:
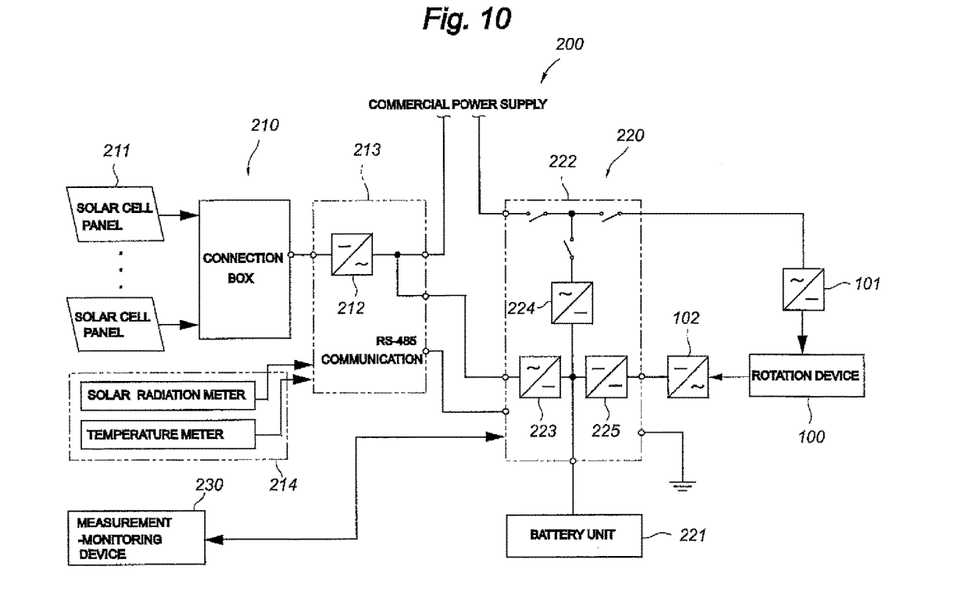
FIG. 10 is a block diagram schematically illustrating configuration of a power supply system with the rotation device shown in FIG. 1.

FIG. 10 shows configuration of a power supply system 200 with the rotation device 100 according to the present invention.

As shown in FIG. 10, the power supply system 200 has the rotation device 100, a solar light power generation device 210, an electrical storage device 220 and a measurement-monitoring device 230.

An AC/DC inverter 101 that converts AC electrical power from the commercial power supply into DC electrical power is connected to a circuit in the rotation device 100, for providing the electrical power to the drive motor 50. Also, to the rotation device 100, an AC/DC inverter 102 that converts AC electrical power from the generator 50A at the time of power generation into DC electrical power is connected.

The solar light power generation device 210 has solar cell panels 211, a PV power conditioner 213 including a DC/AC inverter 212 that converts DC electrical power into AC electrical power, and an environmental measurement unit 214 including a solar radiation meter and a temperature meter.

The electrical storage device 220 has, for example, a battery unit 221 consisting of a plurality of batteries and a charging-discharging control unit 222. The charging-discharging control unit 222 has an AC/DC inverter 223 that converts AC electrical power from the solar light power generation device 210 into DC electrical power, a DC/AC inverter 224 that converts DC electrical power from the battery unit 221 into AC electrical power, and a DC/DC converter 225 connected between the rotation device 100 and the battery unit 221.

The power supply system 200 is capable of providing an electrical power to the rotation device 100 from the electrical storage device 220 or the commercial power supply system and also capable of providing an electrical power generated by the rotation device 100 to at least the electrical storage device 220. Thereby, it is possible to maintain electrical power energy of nighttime power as a rotational energy of the rotation device 100, and also to maintain the electrical power energy of the nighttime power as electrical power energy by charging in the electrical storage device 220. Furthermore, by combining with the solar light power generation device 210, it is possible to effectively utilize the electrical power from the solar light power generation device 210.

Although the rotation device 100 in the aforementioned embodiment has four sets of the rotary plate members 20, the weight members 30 and the clutch mechanisms 40, the rotation device according to the present invention is not limited to this configuration but may have another number of sets and may have another configuration.

Also, in the aforementioned embodiment, the drive motor 50 in the rotation device 100 functions also as a generator 50A. However, the rotation device according to the present invention is not limited to this configuration but, for example, may have a dedicated drive motor and a dedicated generator.

Further, in the aforementioned embodiment, the weight member 30 in the rotation device 100 is formed in a fan shape. However, the weight member according to the present invention is not limited to this configuration but, for example, may be formed in other shape.

In the aforementioned embodiment, also, when the weight member 30 rotates to a position where the center of gravity W of the weight member 30 passes by 15 degrees from the position directly above the center of rotation, the rotation of the planetary gear Ga is limited, and when the weight member 30 rotates to a position where the center of gravity W of the weight member 30 passes by 195 degrees from the position directly above the center of rotation, the cancellation of the rotation limitation of the planetary gear Ga is completed. However, the present invention is not limited to this. For example, the rotation of the planetary gear Ga may be limited when the weight member 30 rotates to a position where the center of gravity W of the weight member 30 passes the position directly above the center of rotation, and the cancellation of the rotation limitation of the planetary gear Ga may be completed when the weight member 30 rotates to a position where the center of gravity W of the weight member 30 passes by 180 degrees from the position directly above the center of rotation. Further, the rotation limitation of the planetary gear Ga and the cancellation thereof may be executed at angles or positions other than the above mentioned angle or position.

Furthermore, although, in the aforementioned embodiment, the support members 1 are formed by metal frames, they may be formed by other material frames such as concrete frames for example.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A rotation device comprising:
an output shaft supported in rotatable state so that an axis line of said output shaft is in parallel to a horizontal direction that is perpendicular to the gravity direction;
at least one rotatable rotary plate member arranged so that rotation axis of said at least one rotary plate member and the axis line of said output shaft are coaxial;
at least one weight member fixed respectively to said at least one rotary plate member, for biasing position of the center of gravity from the rotation axis of said at least one rotary plate member; and
at least one clutch mechanism arranged between said at least one rotary plate member and said output shaft, and capable of separating said at least one rotary plate member and said output shaft with each other at a predetermined rotation angle,
said at least one clutch mechanism being adapted, during rotation of said at least one rotary plate member, to connect said at least one rotary plate member with said output shaft when the center of gravity of said at least one weight member descends, and to separate said at least one rotary plate member from said output shaft when the center of gravity of said at least one weight member rises.

2. The rotation device as claimed in claim 1, wherein said at least one clutch mechanism includes a gear transmission mechanism fixed to said at least one rotary plate member and provided with a plurality of planetary gear, a cam plate fixed to a bearing for supporting said output shaft and provided with an eccentric circular groove on its one side surface and a via hole at the center of said cam plate for passing said output shaft there through, and a cam follower coupled to one of the plurality of planetary gears to move along said eccentric circular groove, and wherein, in one planetary gear coupled to said cam follower, a gear-rotation restraint means capable of limiting rotation of said one planetary gear depending upon displacement of said cam follower is arranged so that said at least one rotary plate member and said output shaft are connected with each other when the rotation of said one planetary gear is limited by said gear-rotation restraint means.

3. The rotation device as claimed in claim 1, wherein said at least one clutch mechanism is adapted, during rotation of said at least one rotary plate member, to connect said at least one rotary plate member with said output shaft when said at least one weight member rotates to a first angle position where the center of gravity of said at least one weight member passes by a predetermined angle from the position directly above the center of rotation, and to separate said at least one rotary plate member from said output shaft when said at least one weight member rotates to a second angle position where the center of gravity of said at least one weight member passes by 180 degrees from the first angle position.

4. The rotation device as claimed in claim 1, wherein said rotation device further comprises at least one auxiliary driving mechanism for assisting the rotation of said at least one rotary plate member and said at least one weight member when the center of gravity of at least one weight member at least rises.

5. The rotation device as claimed in claim 1, wherein said at least one rotatable rotary plate member is a plurality of rotatable rotary plate members arranged so that rotation axes of said rotary plate members and the axis line of said output shaft are coaxial, said at least one weight member is a plurality of weight members fixed respectively to said rotary plate members, for biasing positions of the center of gravity from the rotation axis of said rotary plate members, and said at least one clutch mechanism is a plurality of clutch mechanisms arranged respectively between said rotary plate members and said output shaft, and capable of separating said rotary plate members and said output shaft with each other at a predetermined rotation angle, and wherein said weight members are arranged so that positions of the center of gravity of said weight members have an equal angle interval with each other.

6. A power supply system comprising:
a rotation device including an output shaft supported in rotatable state so that an axis line of said output shaft is in parallel to a horizontal direction that is perpendicular to the gravity direction, at least one rotatable rotary plate member arranged so that rotation axis of said at least one rotary plate member and the axis line of said output shaft are coaxial, at least one weight member fixed respectively to said at least one rotary plate member, for biasing position of the center of gravity from the rotation axis of said at least one rotary plate member, and at least one clutch mechanism arranged between said at least one rotary plate member and said output shaft and capable of separating said at least one rotary plate member and said output shaft with each other at a predetermined rotation angle, said at least one clutch mechanism being adapted, during rotation of said at least one rotary plate member, to connect said at least one rotary plate member with said output shaft when the center of gravity of said at least one weight member descends, and to separate said at least one rotary plate member from said output shaft when the center of gravity of said at least one weight member rises;
a generator coupled to said output shaft of said rotation device;
a solar light power generation device; and
an electrical storage device for storing electrical power generated by said generator and said solar light power generation device,
said power supply system being capable of providing an electrical power to said rotation device from said electrical storage device or a commercial power supply system, and also capable of providing an electrical power from said electrical storage device to outside.

7. The power supply system as claimed in claim 6, wherein said at least one clutch mechanism of said rotation device includes a gear transmission mechanism fixed to said at least one rotary plate member and provided with a plurality of planetary gear, a cam plate fixed to a bearing for supporting said output shaft and provided with an eccentric circular groove on its one side surface and a via hole at the center of said cam plate for passing said output shaft there through, and a cam follower coupled to one of the plurality of planetary gears to move along said eccentric circular groove, and wherein, in one planetary gear coupled to said cam follower, a gear-rotation restraint means capable of limiting rotation of said one planetary gear depending upon displacement of said cam follower is arranged so that said at least one rotary plate member and said output shaft are connected with each other when the rotation of said one planetary gear is limited by said gear-rotation restraint means.

8. The power supply system as claimed in claim 6, wherein said at least one clutch mechanism of said rotation device is adapted, during rotation of said at least one rotary plate member, to connect said at least one rotary plate member with said output shaft when said at least one weight member rotates to a first angle position where the center of gravity of said at least one weight member passes by a predetermined angle from the position directly above the center of rotation, and to separate said at least one rotary plate member from said output shaft when said at least one weight member rotates to a second angle position where the center of gravity of said at least one weight member passes by 180 degrees from the first angle position.

9. The power supply system as claimed in claim 6, wherein said rotation device further comprises at least one auxiliary driving mechanism for assisting the rotation of said at least one rotary plate member and said at least one weight member when the center of gravity of at least one weight member at least rises.

10. The power supply system as claimed in claim 6, wherein said at least one rotatable rotary plate member of said rotation device is a plurality of rotatable rotary plate members arranged so that rotation axes of said rotary plate members and the axis line of said output shaft are coaxial, said at least one weight member is a plurality of weight members fixed respectively to said rotary plate members, for biasing positions of the center of gravity from the rotation axis of said rotary plate members, and said at least one clutch mechanism is a plurality of clutch mechanisms arranged respectively between said rotary plate members and said output shaft and capable of separating said rotary plate members and said output shaft with each other at a predetermined rotation angle, and wherein said weight members of said rotation device are arranged so that positions of the center of gravity of said weight members have an equal angle interval with each other.

* * * * *